(12) United States Patent
Sato

(10) Patent No.: US 9,342,994 B2
(45) Date of Patent: May 17, 2016

(54) MOTION ANALYZING APPARATUS AND MOTION ANALYZING PROGRAM

(71) Applicant: SEIKO EPSON CORPORATION, Tokyo (JP)

(72) Inventor: Masafumi Sato, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/519,617

(22) Filed: Oct. 21, 2014

(65) Prior Publication Data

US 2015/0119158 A1    Apr. 30, 2015

(30) Foreign Application Priority Data

Oct. 30, 2013    (JP) .................................. 2013-226035

(51) Int. Cl.
*G09B 19/00*    (2006.01)
*A63B 69/36*    (2006.01)

(52) U.S. Cl.
CPC ........ *G09B 19/0038* (2013.01); *A63B 69/3632* (2013.01)

(58) Field of Classification Search
USPC .................................. 473/227, 223, 226, 222
See application file for complete search history.

(56) References Cited

U.S. PATENT DOCUMENTS

| 8,672,779 B1* | 3/2014 | Sakyo et al. .................. 473/409 |
| 2005/0032582 A1* | 2/2005 | Mahajan et al. ............... 473/222 |
| 2009/0208061 A1 | 8/2009 | Matsumoto et al. |
| 2012/0316004 A1* | 12/2012 | Shibuya ........................ 473/212 |
| 2014/0073446 A1* | 3/2014 | Davenport .................... 473/223 |
| 2014/0200094 A1* | 7/2014 | Parke et al. ................... 473/223 |

FOREIGN PATENT DOCUMENTS

| JP | A-2008-023036 | 2/2008 |
| JP | A-2008-073210 | 4/2008 |
| JP | A-2009-020897 | 1/2009 |

\* cited by examiner

*Primary Examiner* — Gene Kim
*Assistant Examiner* — Rayshun Peng
(74) *Attorney, Agent, or Firm* — Oliff PLC

(57) ABSTRACT

A motion analyzing apparatus includes a first calculation unit that calculates a position of a first line segment representing a direction in which a rod-like part of a sporting tool extends in a stationary state, a second calculation unit that calculates the position of the first line segment at hitting, and a third calculation unit that specifies a virtual plane formed by the first line segment in the stationary state and a second line segment representing a ball hitting direction, wherein a relation between the virtual plane and the first line segment at the hitting is compared.

12 Claims, 13 Drawing Sheets

MOTION ANALYZING APPARATUS AND MOTION ANALYZING PROGRAM

BACKGROUND

1. Technical Field

The present invention relates to a motion analyzing apparatus, a motion analyzing program, etc.

2. Related Art

For example, in golf as a specific example of motion, a concept of swing plane is generally known. The swing plane corresponds to a trace of a golf club at swing. For example, in Patent Document 1 (JP-A-2009-20897) and Patent Document 2 (JP-A-2008-23036), a golf swing of a subject is taken by a camera or the like from behind of the subject and the swing plane is specified from the taken image.

A method of obtaining the swing plane in Patent Document 1 is obtaining at least two specific points in swing from image data and analyzing a swing plane from the two points. In the method, first, it is necessary to edit image data after the end of swing and perform operation of obtaining the specific points. Accordingly, there are problems that a difference from the actual swing plane is larger and display of the swing plane takes time. Regarding Patent Document 2, the operation of editing image data is necessary, and there are the same problems as those of Patent Document 1.

Further, for coaching of golf swing, metrics of impact line, shaft plane, hogan plane, etc. are known. The impact line is a line as an extension of a shaft of a golf club at impact. When the impact line and the down-swing trace are in parallel, the swing is highly evaluated as on-plane swing. The shaft plane refers to a plane formed by a longitudinal axis direction of the shaft of the golf club and a target line (ball hitting direction) at address (stationary state) of golf. The hogan plane refers to a plane formed by a virtual line connecting from a neck (base of the neck of the golfer) to a ball and the target line (ball hitting direction) at address (stationary state) of golf. A range between the shaft plane and the hogan plane is called V-zone, and the V-zone is determined at address of a golfer and the quality of ball hitting is evaluated depending on whether or not the golf club is in the V-zone at down-swing or impact. If the impact line, the shaft plane, or the hogan plane is displayed as an index on the image, the golfer may easily grasp the points to be improved in the swing form. However, in the methods of Patent Documents 1 and 2, for example, to obtain the hogan plane, there has been no other way to take the figure of the golfer at address from behind and draw lines by hand using a scale or the like based on the taken image. Therefore, in golf swing analysis, there has no mean for simply and accurately presenting the impact line, shaft plane, or hogan plane to the golfer.

SUMMARY

An advantage of at least one aspect of the invention is to provide a motion analyzing apparatus and a motion analyzing program that can easily present a clear index for analysis of motion such as swing.

(1) A motion analyzing apparatus according to an aspect of the invention relates to a motion analyzing apparatus including a first calculation unit that calculates a position of a first line segment representing a direction in which a shaft part of a sporting tool extends in a stationary state using output of an inertial sensor attached to the sporting tool, a second calculation unit that calculates position changes of the first line segment from the stationary state to hitting to calculate the position of the first line segment at hitting using the output of the inertial sensor, and a third calculation unit that specifies a virtual plane formed by the first line segment in the stationary state and a second line segment representing a ball hitting direction, wherein the virtual plane and the position of the first line segment at hitting are compared.

For establishment of the sporting tool in the stationary state, a subject reproduces a position at the moment of impact. As a result, the position at the moment of impact is specified as an impact line (the position of the first line segment at hitting) from a series of motion of "swing". The inertial sensor outputs a detection signal in response to the position of the sporting tool. In response to the detection signal, the position of the first line segment representing the direction in which the shaft part of the sporting tool extends in the stationary state is calculated by the first calculation unit, the position changes of the first line segment from the stationary state to hitting are calculated, and thereby, the position of the first line segment at hitting (impact line) is calculated by the second calculation unit. Further, the virtual plane reflecting the position of the sporting tool in the stationary state is specified by the third calculation unit using the first line segment in the stationary state. The virtual plane may draw out a virtual trace of the sporting tool swung by the swing. The impact line is observed in comparison with the virtual plane as the virtual trace. The motion of the subject is analyzed based on the impact line and the virtual trace (virtual plane) of the sporting tool. In this manner, a clear index with respect to the motion of "swing" is provided. In the aspect of the invention, in the case of golf swing, the virtual plane is regarded as a shaft plane and factors of the quality of ball hitting may be pursued by comparison between the shaft plane at address and the impact line, for example.

(2) In the aspect of the invention, the inertial sensor may include an acceleration sensor and the first calculation unit may calculate a tilt of the shaft part with respect to a direction of gravitational force using output from the acceleration sensor in the stationary state and use the tilt as the position of the first line segment in the stationary state.

In the aspect of the invention, how a shaft (first line segment) of a golf club tilts with respect to the direction of gravitational force may be obtained using the output from the acceleration sensor in the stationary state, and thereby, the first line segment and the virtual plane (shaft plane) containing the line segment may be determined. Note that the position changes of the first line segment from the stationary state to hitting may be calculated by integration of the output of an angular velocity sensor included in the inertial sensor, and the position of the first line segment at hitting may be used as the impact line.

Further, the inertial sensor may be attached to the shaft part, particularly, of the sporting tool. In the aspect of the invention, it is preferable that the inertial sensor is attached to the shaft part of the sporting tool (in the case of a golf club, the shaft part including a grip). Thereby, the first line segment, the virtual plane, and a swing trace may be obtained with higher accuracy.

(3) A motion analyzing apparatus according to another aspect of the invention relates to a motion analyzing apparatus including a first calculation unit that calculates a position of a first line segment representing a direction in which a shaft part of a sporting tool extends in a stationary state using output of a first inertial sensor attached to the sporting tool, a second calculation unit that calculates position changes of the first line segment from the stationary state to hitting to calculate the position of the first line segment at hitting using the output of the first inertial sensor, a third calculation unit that specifies a third line segment representing a direction from a shoulder of a subject to an end of the shaft part in the stationary state using the output of the first inertial sensor and output of a second inertial sensor attached to an arm of the subject, and a fourth calculation unit that specifies a virtual plane formed by a second line segment representing a ball hitting direction and the third line segment, wherein the virtual plane and the position of the first line segment at hitting are compared.

In the another aspect of the invention, the first calculation unit calculates the position of the first line segment in the stationary state using the output of the first inertial sensor attached to the sporting tool, and the second calculation unit calculates the position of the first line segment at impact (impact line). The third calculation unit specifies the third line segment representing the direction from the shoulder of the subject to the end of the shaft part in the stationary state using the output of the second inertial sensor attached to the arm of the subject, and the fourth calculation unit calculates the virtual plane specified by the second line segment representing the ball hitting direction and the third line segment. The virtual plane is regarded as a hogan plane and factors of the quality of ball hitting may be pursued by comparison between the hogan plane at address and the impact line, for example.

(4) In the another aspect of the invention, the first inertial sensor may include a first acceleration sensor, the second inertial sensor may include a second acceleration sensor, the first calculation unit may calculate a tilt of the shaft part with respect to a direction of gravitational force using output from the first acceleration sensor in the stationary state and use the tilt as the position of the first line segment in the stationary state, and the third calculation unit may calculate a location of an end of the shaft part from the tilt of the shaft part and length information of the shaft part, calculate a tilt of the arm with respect to the direction of gravitational force using output from the second acceleration sensor in the stationary state, calculate a location of the shoulder from the tilt of the arm and the length information of the arm, and specify the third line segment.

In the another aspect of the invention, for example, a hogan plane (virtual plane) of the golf club and the initial position of the first line segment in the stationary state may be easily specified using the output from the first, second inertial sensors in the stationary state. When the output of the angular velocity sensor in the first inertial sensor is used, the position changes of the first line segment from the stationary state to hitting may be calculated and the position of the first line segment at hitting (impact line) may be easily specified.

(5) A motion analyzing apparatus according to still another aspect of the invention relates to a motion analyzing apparatus including a first calculation unit that calculates a position of a first line segment representing a direction in which a shaft part of a sporting tool extends in a stationary state using output of an inertial sensor attached to the sporting tool, a second calculation unit that calculates position changes of the first line segment from the stationary state to hitting to calculate the position of the first line segment at hitting using the output of the inertial sensor, and a third calculation unit that calculates a movement trace of one point on the sporting tool from the stationary state to the hitting using the output of the inertial sensor or a calculation result of the second calculation unit, wherein the movement trace of one point on the sporting tool and the position of the first line segment at the hitting are compared.

In the still another aspect of the invention, the first calculation unit calculates the position of the first line segment in the stationary state using the output of the inertial sensor, and the second calculation unit calculates the position of the first line segment at hitting (impact line). The third calculation unit calculates the movement trace of one point on the sporting tool from the stationary state to hitting using the output of the inertial sensor or the calculation result of the second calculation unit. For example, in the case of golf swing, by comparison between the movement trace of one point on the sporting tool and the impact line (the position of the first line segment in the stationary state), whether or not on-plane swing in which the movement trace is in parallel to the impact line has been reproduced may be confirmed and the factors of the quality of ball hitting may be pursued.

(6) A motion analyzing apparatus according to yet another aspect of the invention relates to a motion analyzing apparatus including a first calculation unit that calculates a position of a first line segment representing a direction in which a shaft part of a sporting tool extends in a stationary state using output of a first inertial sensor attached to the sporting tool, a second calculation unit that calculates position changes of the first line segment from the stationary state to hitting to calculate the position of the first line segment at hitting using the output of the first inertial sensor, a third calculation unit that specifies a first virtual plane formed by the first line segment in the stationary state and a second line segment representing a ball hitting direction, a fourth calculation unit that specifies a third line segment representing a direction from a shoulder of a subject to an end of the shaft part in the stationary state using the output of the first inertial sensor and output of a second inertial sensor attached to an arm of the subject, and a fifth calculation unit that specifies a second virtual plane formed by the second line segment and the third line segment, wherein the first virtual plane and second virtual plane and the position of the first line segment at hitting are compared.

In the yet another aspect of the invention, for example, in the case of golf swing, the first virtual plane is regarded as a hogan plane and the second virtual plane is regarded as a shaft plane, and factors of the quality of ball hitting may be pursued by comparison between the V-zone sandwiched by the hogan plane and the shaft plane at address and the impact line (the position of the first line segment at hitting), for example.

(7) A motion analyzing apparatus according to still yet another aspect of the invention relates to a motion analyzing apparatus including a first calculation unit that calculates a position of a first line segment representing a direction in which a shaft part of a sporting tool extends in a stationary state using output of an inertial sensor attached to the sporting tool, a second calculation unit that calculates position changes of the first line segment from the stationary state to hitting to calculate the position of the first line segment at hitting using the output of the inertial sensor, a third calculation unit that specifies a first virtual plane formed by the first line segment in the stationary state and a second line segment representing a ball hitting direction, and a fourth calculation unit that specifies a second virtual plane by rotation of the first virtual plane around a rotation axis of the second line segment, wherein the first virtual plane and second virtual plane and the position of the first line segment at hitting are compared.

According to the configuration, for example, in the case of golf, if the inertial sensor is attached only to the shaft of the golf club, both the shaft plane as the first virtual plane and the Kogan plane as the second virtual plain may be specified without using the second inertial sensor.

(8) In the respective aspects of the invention described above, the second line segment may be set in a direction orthogonal to a ball hitting surface of the sporting tool in the stationary state.

The second line segment may be particularly set in the orthogonal direction as a direction intersecting with the ball hitting surface of the sporting tool. In the respective aspects of the invention, the ball hitting direction is used as the target line and, for example, in the case of golf, the shaft plane as the virtual plane (first virtual plane) and/or the hogan plane as the virtual plane (second virtual plane) are calculated. Thereby, the subject may perform a series of motion of "swing" based on the imaged virtual trace. In this manner, the better improvements may be made to the swing motion.

(9) In the respective aspects of the invention described above, the motion analyzing apparatus may include an image data generation unit that generates image data for visualizing output of the second, third calculation units. Thereby, for example, in the case of golf, the impact line (the position of the first line segment at hitting) maybe compared to the shaft plane, the hogan plane, or the movement trace of the sporting tool. In this manner, the better improvements may be made to the swing motion.

(10) In the respective aspects of the invention described above, the motion analyzing apparatus may include an image data generation unit that generates image data for visualizing output of the second calculation unit, the third calculation unit, and the fourth calculation unit. Thereby, the range (v-zone) between the first virtual plane (shaft plane) and the second virtual plane (hogan plane) and the impact line (the position of the first line segment at hitting) may be presented at the same time. The subject may visually compare the its own swing to the two virtual planes. For example, by repeated changes and observations of the form, the better improvements may be made to the form of the golf swing through trial and error.

(11) Further another aspect of the invention relates to a motion analyzing program allowing a computer to execute calculating a position of a first line segment representing a direction in which a shaft part of a sporting tool extends in a stationary state using an output signal of an inertial sensor, specifying a virtual plane formed by the first line segment in the stationary state and a second line segment set in a ball hitting direction, calculating position changes of the first line segment from the stationary state to hitting to calculate the position of the first line segment at hitting using the output signal, and comparing the virtual plane and the position of the first line segment at hitting.

(12) Still further another aspect of the invention relates to a motion analyzing program allowing a computer to execute calculating a position of a first line segment representing a direction in which a shaft part of a sporting tool extends in a stationary state using an output signal of a first inertial sensor attached to the sporting tool, specifying a virtual plane formed by a second line segment set in a ball hitting direction and a third line segment representing a direction from a shoulder of a subject to an end of the shaft part in the stationary state using the output signal of the first inertial sensor and an output signal of a second inertial sensor attached to an arm of the subject, and calculating position changes of the first line segment from the stationary state to hitting to calculate the position of the first line segment at hitting using the output signal, and comparing the virtual plane and the position of the first line segment at hitting.

(13) Yet further another aspect of the invention relates to a motion analyzing program allowing a computer to execute calculating a position of a first line segment representing a direction in which a shaft part of a sporting tool extends in a stationary state using an output signal of an inertial sensor, calculating position changes of the first line segment from the stationary state to hitting to calculate the position of the first line segment at hitting using the output signal, calculating a movement trace of one point on the sporting tool from the stationary state to the hitting using the output signal or the position changes of the first line segment, and comparing the movement trace of one point on the sporting tool and the position of the first line segment at the hitting.

The motion analyzing program according to the aspect of the invention may allow a computer to execute the operation of the motion analyzing apparatus according to the respective aspects of the invention. The program may be initially stored in the motion analyzing apparatus, may be stored in a memory medium and installed in the motion analyzing apparatus, or may be downloaded from a server to a communication terminal of the motion analyzing apparatus through a network.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, one embodiment of the invention will be explained with reference to the accompanying drawings. The embodiment to be described as below does not unduly limit the invention described in the appended claims, and not all of the configurations explained in the embodiment are always essential as solving means of the invention.

Figure 1:
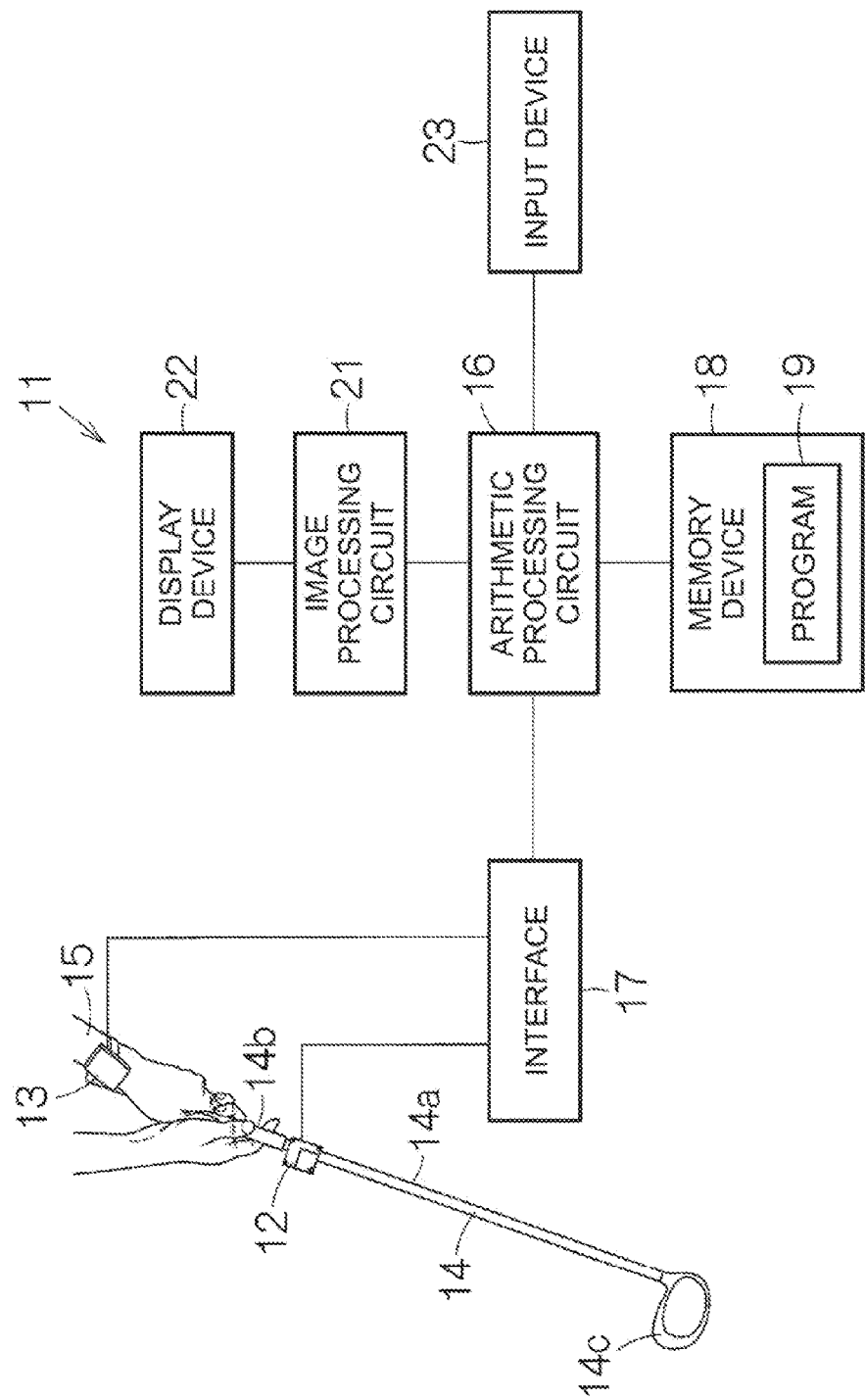
FIG. 1 is a conceptual diagram schematically showing a configuration of a golf swing analyzing apparatus according to a first embodiment of the invention.

(1) Configuration of Golf Swing Analyzing Apparatus According to First Embodiment FIG. 1 schematically shows a configuration of a golf swing analyzing apparatus (motion analyzing apparatus) 11 according to the first embodiment of the invention. The golf swing analyzing apparatus 11 includes, e.g., a first inertial sensor 12 and a second inertial sensor 13. An acceleration sensor and a gyro sensor are incorporated in each of the first and second inertial sensors 12, 13. The acceleration sensor can individually detect accelerations generated in directions of orthogonal three axes. The gyro sensor can individually detect angular velocities around the respective three orthogonal axes. The first and second inertial sensors 12, 13 output detection signals. The acceleration and the angular velocity are specified with respect to each axis by the detection signals. The acceleration sensor and the gyro sensor detect information of the accelerations and the angular velocities. The second inertial sensor 13 is attached to an upper limb of a golfer (e.g., a left arm for a right-handed golfer) 15. Here, an example in which the second inertial sensor 13 is attached to the forearm of the golfer is shown, however, the second inertial sensor 13 may be attached to an upper body including an upper arm and both shoulders. The first inertial sensor 12 is attached to a golf club (sporting tool) 14. The golf club 14 has a shaft 14a and a grip 14b. The grip 14b is held by hands. The grip 14b is coaxially formed with the longitudinal axis of the shaft 14a. A club head 14c is coupled to the end of the shaft 14a. Desirably, the first inertial sensor 12 is attached to the shaft 14a or the grip 14b as a shaft part of the golf club 14. It is only necessary that the first and second inertial sensors 12, 13 are relatively immovably fixed to the upper limb 15 and the golf club 14, respectively. Here, for attachment of the first inertial sensor 12, one of the detection axes of the first inertial sensor 12 is aligned with the longitudinal axis direction of the shaft 14a (the direction in which the shaft extends).

The golf swing analyzing apparatus 11 includes an arithmetic processing circuit (calculation unit) 16. The first and second inertial sensors 12, 13 are connected to the arithmetic processing circuit 16. For the connection, a predetermined interface circuit 17 is connected to the arithmetic processing circuit 16. The interface circuit 17 may be in wired or wireless connection to the inertial sensors 12, 13. The detection signals are input from the inertial sensors 12, 13 to the arithmetic processing circuit 16.

A memory device 18 is connected to the arithmetic processing circuit 16. For example, a golf swing analysis software program 19 and relevant data are stored in the memory device 18. The arithmetic processing circuit 16 executes the golf swing analysis software program 19 to realize a golf swing analyzing method. The memory device 18 includes a DRAM (dynamic random access memory), a mass-storage unit, an nonvolatile memory, etc. For example, the golf swing analysis software program 19 is temporarily held in the DRAM for implementation of the golf swing analyzing method. The golf swing analysis software program and the data are saved in the mass-storage unit such as a hard disc drive (HDD). Programs and data having relatively low capacity such as BIOS (basic input/output system) are stored in the nonvolatile memory.

An image processing circuit 21 is connected to the arithmetic processing circuit 16. The arithmetic processing circuit 16 sends predetermined image data to the image processing circuit 21. A display device 22 is connected to the image processing circuit 21. For the connection, a predetermined interface circuit (not shown) is connected to the image processing circuit 21. The image processing circuit 21 sends image signals to the display device 22 in response to the input image data. Images specified by the image signals are displayed on the screen of the display device 22. A liquid crystal display or another flat panel display is used for the display device 22. Here, the arithmetic processing circuit 16, the memory device 18, and the image processing circuit 21 are provided as a computer device, for example.

An input device 23 is connected to the arithmetic processing circuit 16. The input device 23 includes at least alphabet keys and a numeric key pad. Character information and numeric information are input from the input device 23 to the arithmetic processing circuit 16. The input device 23 may include a keyboard, for example. The combination of the computer device and the keyboard may be replaced by a smartphone, a cell phone, or a tablet PC (personal computer).

(2) Motion Analysis Model

Figure 2:
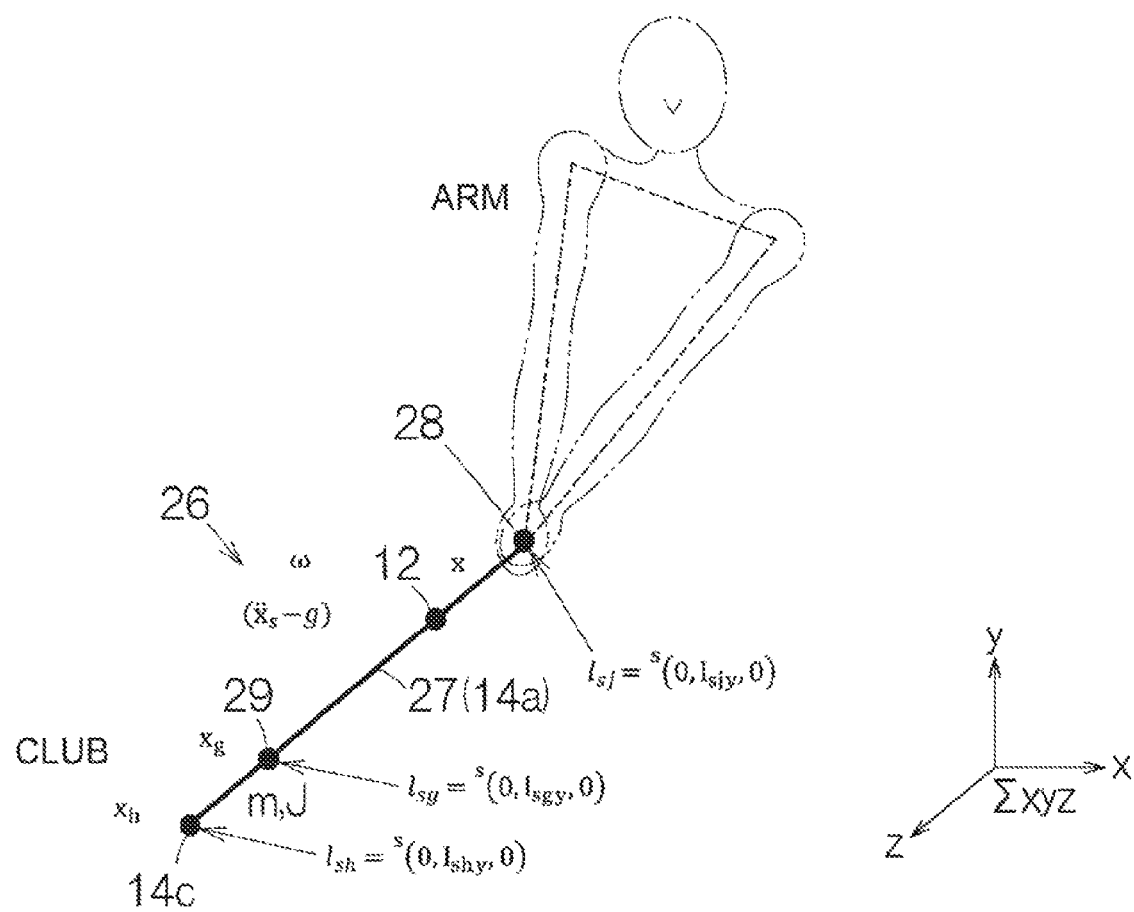
FIG. 2 is a conceptual diagram schematically showing relations among a swing model, a golfer, and a golf club.

The arithmetic processing circuit 16 defines a virtual space. The virtual space is formed by a three-dimensional space. The three-dimensional space specifies a real space. As shown in FIG. 2, the three-dimensional space has an absolute reference coordinate system (global coordinate system) $\Sigma XYZ$. In the three-dimensional space, a three-dimensional motion analysis model 26 is constructed according to the absolute reference coordinate system $\Sigma XYZ$. A rod 27 of the three-dimensional motion analysis model 26 is point-constrained at a supporting point 28 (coordinate x). The rod 27 three-dimensionally moves about the supporting point 28 as a pendulum. The location of the supporting point 28 may be shifted. Here, according to the absolute reference coordinate system $\Sigma XYZ$, the location of a center of gravity 29 of the rod 27 is specified by a coordinate xg and the location of the club head 14c is specified by a coordinate xh.

The three-dimensional motion analysis model 26 corresponds to modelization of the golf club 14 at swing. The rod 27 of the pendulum projects the shaft 14a of the golf club 14. The supporting point 28 of the rod 27 projects the grip 14b. The first inertial sensor 12 is fixed to the rod 27. The location of the first inertial sensor 12 is specified by a coordinate xs according to the absolute reference coordinate system $\Sigma XYZ$. The first inertial sensor 12 outputs acceleration signals and angular velocity signals. Acceleration a containing the influence by the acceleration of gravitational force g is specified by the acceleration signals, and an angular velocity $\omega$ is specified by the angular velocity signals.

The arithmetic processing circuit 16 similarly fixes a local coordinate system $\Sigma s$ to the first inertial sensor 12. The origin of the local coordinate system $\Sigma s$ is set to the origin of the detection axis of the first inertial sensor 12. The y-axis of the local coordinate system $\Sigma s$ coincides with the axis of the shaft 14a. The x-axis of the local coordinate system $\Sigma s$ coincides with a ball hitting direction specified by the orientation of the face. Therefore, the location lsj of the supporting point is specified by (0,lsjy,0) according to the local coordinate system $\Sigma s$. Similarly, on the local coordinate system $\Sigma s$, the location lsg of the center of gravity 29 is specified by (0,lsgy, 0) and the location lsh of the club head 14c is specified by (0,lshy,0).

Figure 3:
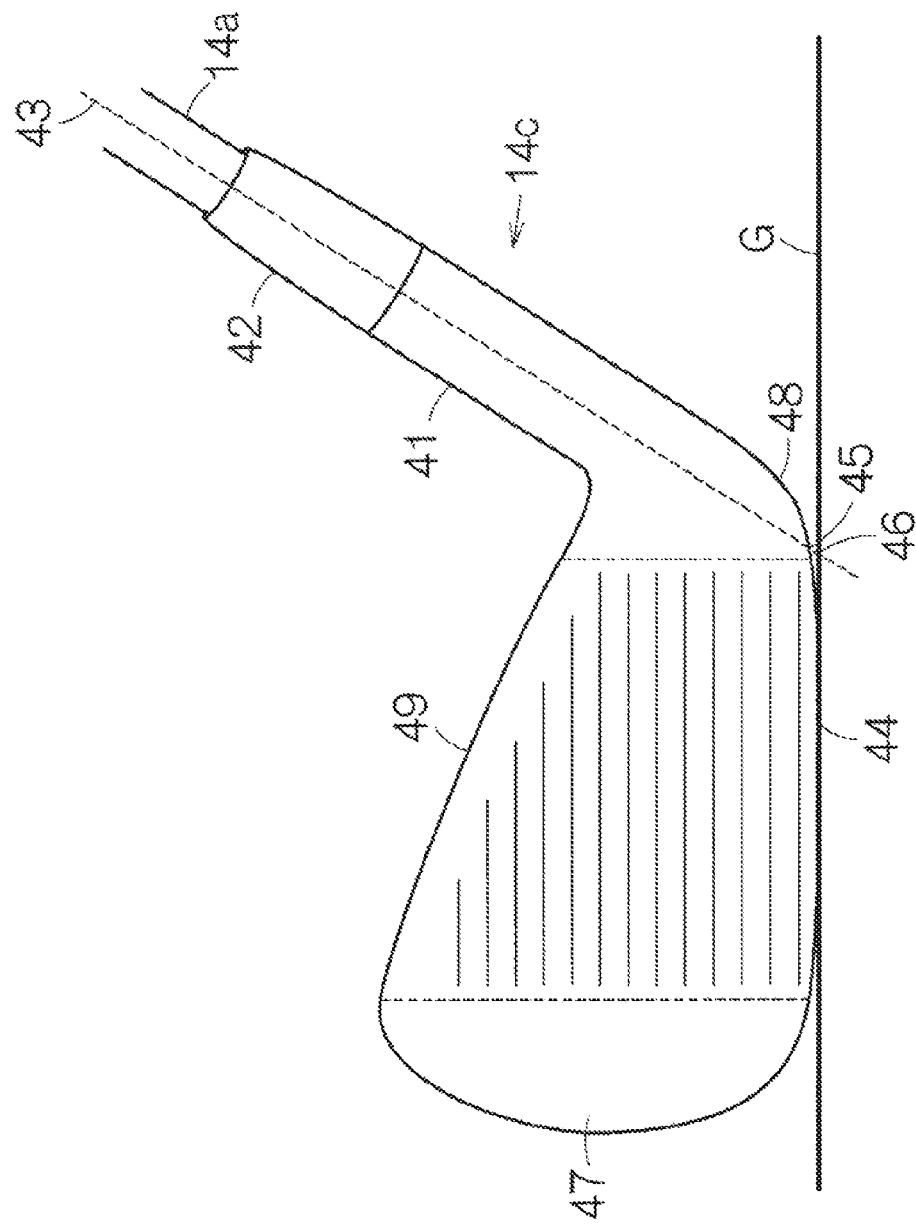
FIG. 3 is a conceptual diagram regarding a location of a club head used for the swing model.

As shown in FIG. 3, the shaft 14a is inserted into a hosel 41 in the club head 14c. A ferrule 42 is provided at the boundary between the hosel 41 and the shaft 14a. The longitudinal axes of the hosel 41 and the ferrule 42 are provided coaxially with a longitudinal axis 43 of the shaft 14a. The location of the club head 14c may be specified by an intersection 45 between the extension of the longitudinal axis direction (axis line) 43 of the shaft 14a and a sole 44 of the club head 14c, for example. Or, the location of the club head 14c may be specified by an intersection 46 between the extension of the longitudinal axis 43 of the shaft 14a and the ground G when the sole 44 of the club head 14c is flatly in contact with the ground G. In addition, unless imaging to be described later is adversely affected, the position of the club head 14c may be set by a toe 47, a heel 48, another part of the sole 44, or a crown 49 of the club head 14c, or around them. Note that it is desirable that the location of the club head 14c is set in the axis direction 43 (or its extension) of the shaft 14a.

Figure 4:
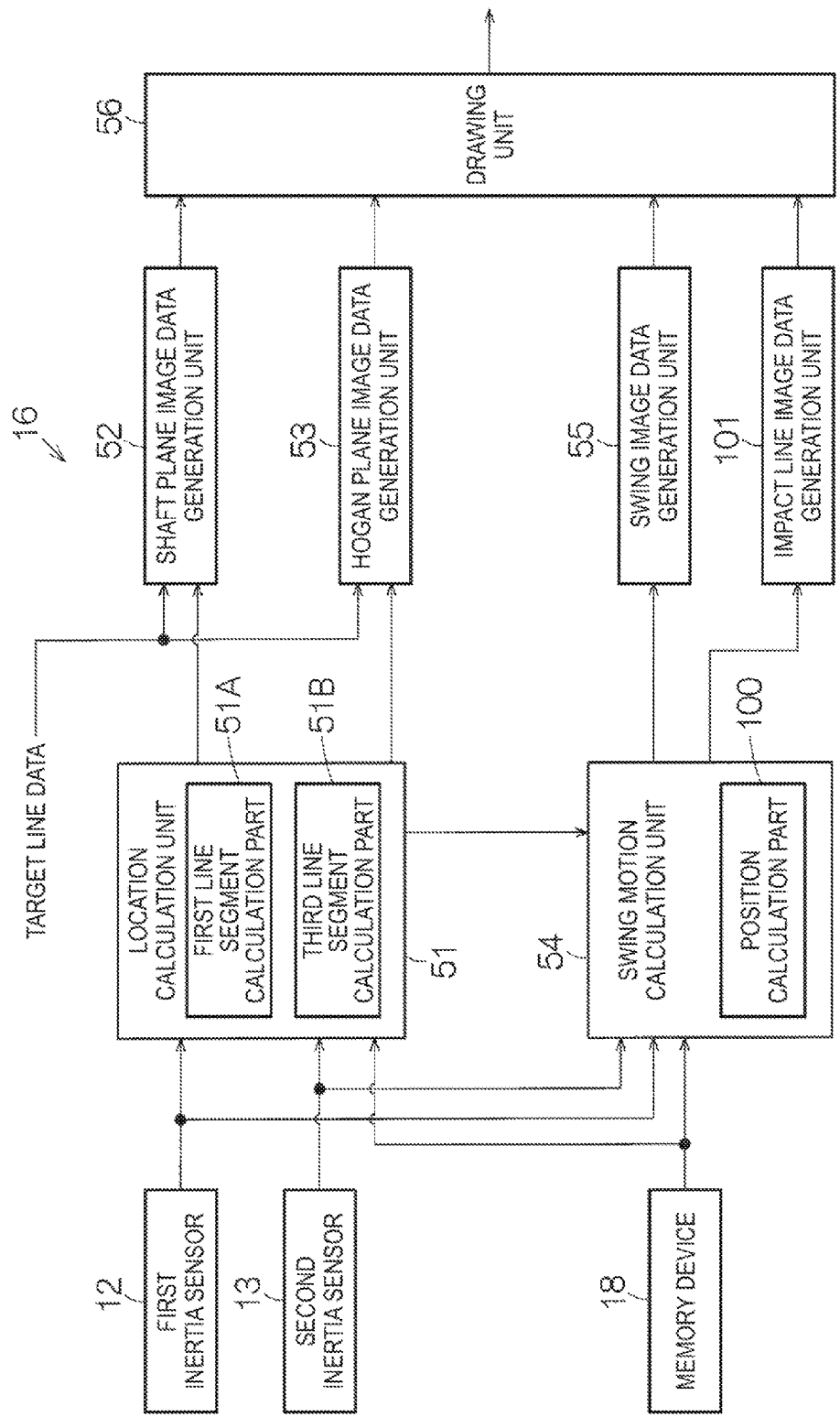
FIG. 4 is a block diagram schematically showing a configuration of an arithmetic processing circuit according to the first embodiment.

(3) Configuration of Arithmetic Processing Circuit According to First Embodiment FIG. 4 schematically shows a configuration of the arithmetic processing circuit 16 according to the first embodiment. The arithmetic processing circuit 16 includes a location calculation unit 51. The acceleration signals and the angular velocity signals are input from the first inertial sensor 12 and the second inertial sensor 13 to the location calculation unit 51. The location calculation unit 51 includes a first line segment calculation part 51A and a third line segment calculation part 51B. The first line segment calculation part 51A calculates a first line segment 81 (see FIG. 6) representing a direction in which the shaft 14a of the golf club 14 extends in the stationary state according to the absolute reference coordinate system in the virtual three-dimensional space at least based on the acceleration signals of the first inertial sensor 12. The location calculation unit 51 obtains coordinates of the club head 14c and coordinates of a grip end from the first line segment 81. The third line segment calculation part 51B obtains a tilt of an arm of the subject, calculates coordinates of the shoulder from the length of the arm and the tilt of the arm of the subject, and calculates a third line segment 86 (see FIG. 7) representing a direction from the shoulder to the club head 14c at least based on the acceleration signals of the second inertial sensor 13. The calculation methods will be described later. For the calculation, the location calculation unit 51 acquires various numerical data such as data on length information of the shaft including club head data and grip end data and shoulder data from the memory device 18. The club head data specifies the location of the club head 14c according to the output of the first inertial sensor 12, for example. The grip end data specifies the location of the grip end according to the output of the first inertial sensor 12, for example. In addition, for the specification of the location of the club head 14c and the location of the grip end, the length of the golf club 14 may be specified and the location of the first inertial sensor 12 may be specified on the golf club 14. The shoulder data specifies the location of the shoulder of the subject according to the output of the second inertial sensor 13, for example. Or, the location of the shoulder may be specified based on length data representing the distance from the second inertial sensor 13 to the shoulder of the subject. In addition, for the specification of the location of the shoulder, the height and the length of the left arm of the subject may be specified and the location of the second inertial sensor 13 may be specified on the arm.

The arithmetic processing circuit 16 includes a swing motion calculation unit (third calculation unit) 54. The acceleration signals and the angular velocity signals are input from the first inertial sensor 12 and the second inertial sensor 13 to the swing motion calculation unit 54. The swing motion calculation unit 54 calculates a movement trace of the golf club 14 at swing based on the accelerations and the angular velocities.

Here, in the embodiment, the swing motion calculation unit 54 may include a position calculation part 100. Position data of the first line segment 81 in the stationary state is input from the first line segment calculation part 51A of the location calculation unit 51 and the angular velocity signals are input from the second inertial sensor 13 to the position calculation part 100. The position calculation part 100 calculates position changes of the first line segment 81 from the stationary state to hitting and calculates a position of the first line segment 81 (impact line) at hitting. The position of the first line segment 81 at hitting is an impact line as an extension of the shaft 14a of the golf club 14 at impact (hitting). Note that the movement trace of an arbitrary one point on the first line segment 81 may be obtained from the movement trace of the first line segment 81 obtained when the position changes of the first line segment 81 from the stationary state to hitting are calculated by the position calculation part 100. Not limited to that, but the movement trace of an arbitrary one point on the first line segment 81 maybe calculated using the output signals from the first, second inertial sensors 12, 13.

The arithmetic processing circuit 16 includes an impact line image data generation unit 101, a shaft plane image data generation unit (third calculation unit) 52, and a hogan plane image data generation unit (fourth or fifth calculation unit) 53. The impact line image data generation unit 101 generates impact line image data based on the output from the position calculation part 100. In this sense, the position calculation part 100 or the position calculation part 100 and the impact line image data generation unit 101 form a second calculation unit. The shaft plane refers to a plane formed by the longitudinal axis direction of the shaft 14a of the golf club 14 and the target line (ball hitting direction) at address of golf (stationary state), and the hogan plane refers to a plane formed by a virtual line connecting from the neck (the base of the neck) of the golfer to a ball and the target line (ball hitting direction) at address of golf. Note that the hogan plane is also a virtual line connecting from the shoulder of the golfer to the ball because the location of the neck and the location of the shoulder are nearly aligned in a line when the subject is seen from the side. The shaft plane image data generation unit 52 and the hogan plane image data generation unit 53 are connected to the location calculation unit 51. The shaft plane image data generation unit 52 generates three-dimensional image data that three-dimensionally visualizes the first virtual plane, i.e., the shaft plane based on the coordinates of the grip end. For the generation of the three-dimensional image data, the shaft plane image data generation unit 52 refers to the target line data. The target line data represents a target line as a line segment that specifies the ball hitting direction in the absolute reference coordinate system. Note that the target line is in a direction crossing the face of the club head 14c at address (stationary state). The hogan plane image data generation unit 53 generates three-dimensional image data that three-dimensionally visualizes the second virtual plane, i.e., the hogan plane based on the coordinates of the shoulder of the subject. For the generation of the three-dimensional image data, similarly, the hogan plane image data generation unit 53 refers to the target line data.

The arithmetic processing circuit 16 includes a swing image data generation unit 55. The swing image data generation unit 55 is connected to the swing motion calculation unit 54. The swing image data generation unit 55 generates three-dimensional image data for visualizing the movement trace of the golf club 14 along the time axis.

The arithmetic processing circuit 16 includes a drawing unit 56. The drawing unit 56 is connected to the impact line image data generation unit 101, the shaft plane image data generation unit 52, the hogan plane image data generation unit 53, and the swing image data generation unit 55. The drawing unit 56 generates image data for visualizing the shaft plane, the hogan plane, or the movement trace of the golf club 14 superimposed on the impact line based on the impact line image data of the impact line image data generation unit 101, the three-dimensional image data of the shaft plane image data generation unit 52, the three-dimensional image data of the hogan plane image data generation unit 53, and the three-dimensional image data of the swing image data generation unit 55.

Figure 5:
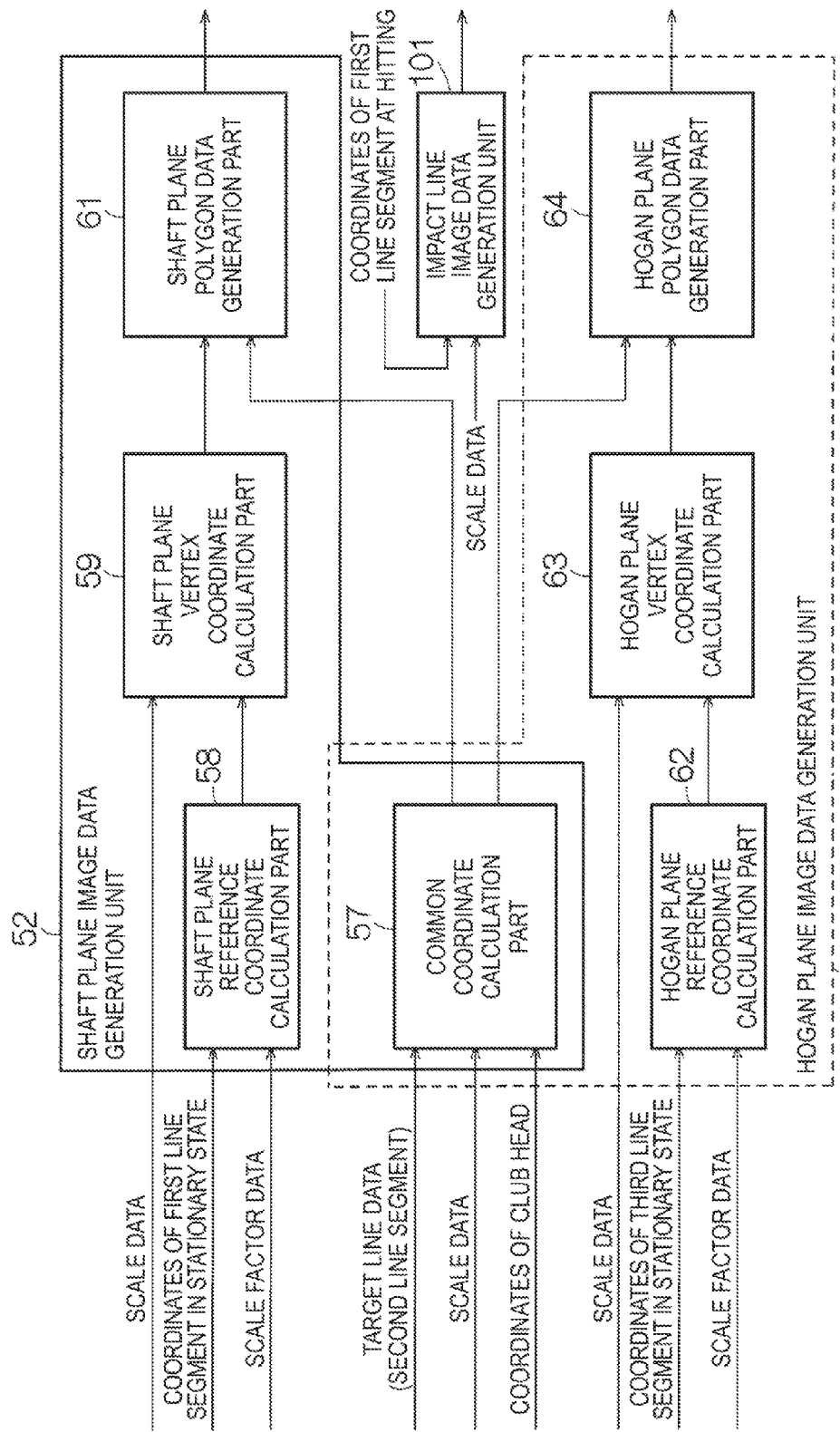
FIG. 5 is a block diagram schematically showing a configuration of a shaft plane image data generation unit and a Kogan plane image data generation unit.

As shown in FIG. 5, the coordinates of the first line segment 81 at hitting as output of the position calculation part 100 and scale data are input to the impact line image data generation unit 101, and the unit outputs the impact line image data. The shaft plane image data generation unit 52 includes a common coordinate calculation part 57, a shaft plane reference coordinate calculation part 58, a shaft plane vertex coordinate calculation part 59, and a shaft plane polygon data generation part 61. The common coordinate calculation part 57 calculates coordinates of two vertexes of the shaft plane based on the target line data. The details will be described later. The shaft plane reference coordinate calculation part 58 calculates a reference location of the shaft plane on the extension line of the longitudinal axis 43 of the shaft 14a based on the coordinates of the grip end. The shaft plane vertex coordinate calculation part 59 is connected to the shaft plane reference coordinate calculation part 58. The shaft plane vertex coordinate calculation part 59 calculates the coordinates of two vertexes of the shaft plane based on the calculated reference location of the shaft plane. The shaft plane polygon data generation part 61 is connected to the shaft plane vertex coordinate calculation part 59 and the common coordinate calculation part 57. The shaft plane polygon data generation part 61 generates polygon data of the shaft plane based on the calculated coordinates of the four vertexes in total. The polygon data corresponds to three-dimensional image data for three-dimensionally visualizing the shaft plane.

Similarly, the hogan plane image data generation unit 53 includes the common coordinate calculation part 57, a hogan plane reference coordinate calculation part 62, a hogan plane vertex coordinate calculation part 63, and a hogan plane polygon data generation part 64. The common coordinate calculation part 57 calculates coordinates of two vertexes of the hogan plane based on the target line data. Here, the hogan plane image data generation unit 53 and the shaft plane image data generation unit 52 have the common coordinate calculation part 57 in common because the two vertexes of the shaft plane and the two vertexes of the hogan plane overlap with each other on the target line. The hogan plane reference coordinate calculation part 62 calculates a reference location of the hogan plane on the extension line of the longitudinal axis of the left arm based on the coordinates of the shoulder. The hogan plane vertex coordinate calculation part 63 is connected to the hogan plane reference coordinate calculation part 62. The hogan plane vertex coordinate calculation part 63 calculates the coordinates of two vertexes of the hogan plane based on the calculated reference location of the hogan plane. The hogan plane polygon data generation part 64 is connected to the hogan plane vertex coordinate calculation part 63 and the common coordinate calculation part 57. The hogan plane polygon data generation part 64 generates polygon data of the hogan plane based on the calculated coordinates of the four vertexes in total. The polygon data corresponds to three-dimensional image data for three-dimensionally visualizing the hogan plane.

Figure 6:
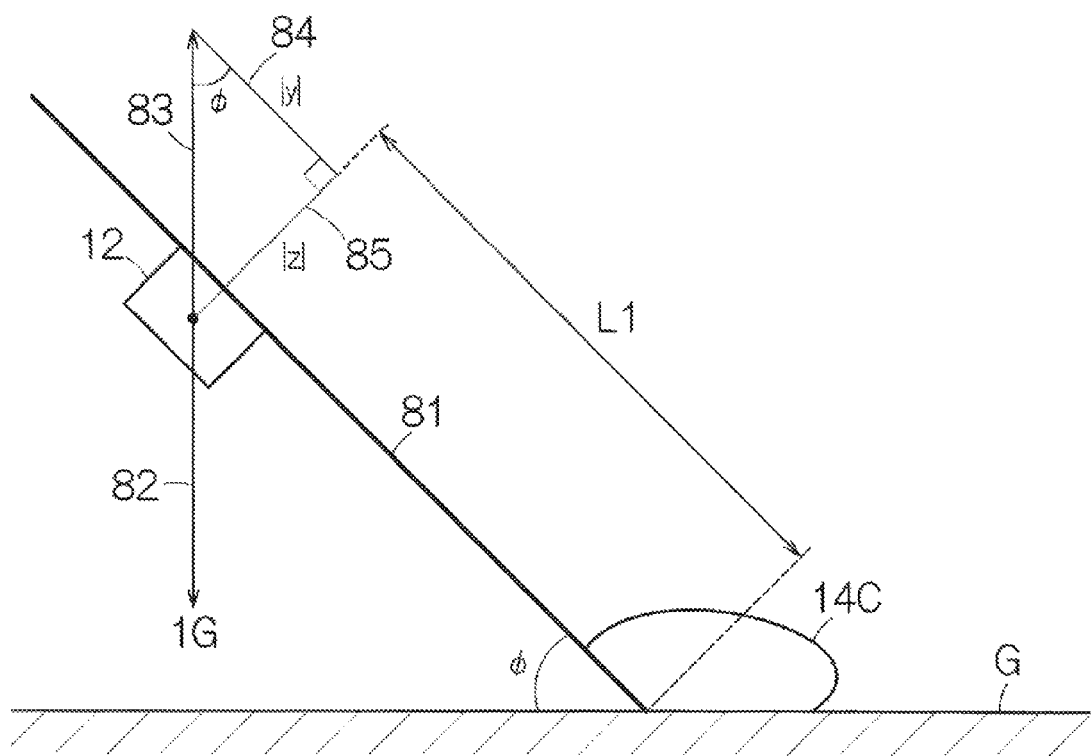
FIG. 6 is a conceptual diagram schematically showing a method of calculating a first line segment representing a longitudinal axis of a shaft.

Here, FIG. 6 shows an example of a method of obtaining the line segment (first line segment) 81 representing the direction in which the longitudinal axis 43 of the shaft 14a extends in the stationary state by the first line segment calculation part (first calculation unit) 51A of the location calculation unit 51. The line segment 81 is obtained from the output of the acceleration sensor of the first inertial sensor 12 attached to the shaft 14a of the golf club 14 in the stationary state. The acceleration sensor of the first inertial sensor 12 has a plurality of detection axes and is fixed to the shaft 14a so that one of the detection axes may be aligned with the longitudinal axis direction of the shaft 14a. An upward force 83 opposite to the downward gravitational force 82 acts on the first inertial sensor 12. The acceleration sensor of the first inertial sensor 12 resolves and measures the upward force 83 acting by the gravitational force 82 into a first force component 84 along the longitudinal axis direction of the shaft 14a and a second force component 85 orthogonal to the longitudinal axis direction of the shaft 14a. A tilt angle φ of the longitudinal axis direction of the shaft 14a with respect to the direction of the gravitational force is obtained using a trigonometric function from the resolved force components 84, 85. Here, the force component 84 corresponds to an acceleration vector $(=|y|)$ in the shaft longitudinal axis direction (y-axis direction) and the force component 85 corresponds to an acceleration vector $(=|z|)$ in a direction orthogonal to the acceleration vector (e.g., z-axis direction).

$$\varphi = \tan^{-1}\frac{|z|}{|y|}$$

Then, the first line segment 81 is determined by previously input length information L1 of the shaft 14a and the previously obtained tilt angle φ in the longitudinal axis direction of the shaft 14a.

The position calculation part (second calculation unit) 100 calculates position changes of the first line segment 81 from the stationary state to hitting using the output from the first inertial sensor 12 under an initial condition of the position of the first line segment 81 in the stationary state that the acceleration calculated by the first line segment calculation part 51A of the location calculation unit 51 is zero. The position changes of the first line segment 81 are calculated by integration of the output of the triaxial angular velocity sensor of the first inertial sensor 12 from the stationary state to hitting. The hitting may be discriminated because the output of the acceleration sensor of the first inertial sensor 12 becomes maximum, for example.

The angular velocity [rad/s] measured by the triaxial angular velocity sensor of the first inertial sensor 12 is expressed by:

$$\vec{\omega}=(\omega_x, \omega_y, \omega_z),$$

and the magnitude of the angular velocity is expressed by:

$$|\vec{\omega}| = \sqrt{\omega_x^2 + \omega_y^2 + \omega_z^2}.$$

Supposing that a change angle θ [rad] per unit time Δt is $\theta=|\vec{\omega}|$, a quaternion Q=(w,x,y,z) is expressed as follows.

$$w = \cos\frac{\theta}{2}$$

$$x = \frac{\omega_x}{|\vec{\omega}|}\cdot\sin\frac{\theta}{2}$$

$$y = \frac{\omega_y}{|\vec{\omega}|}\cdot\sin\frac{\theta}{2}$$

-continued $$z = \frac{\omega_z}{|\bar{\omega}|} \cdot \sin\frac{\theta}{2}$$

Using the quaternion Q=(w, x, y, z), a rotation matrix R is expressed as follows.

$$R = \begin{pmatrix} w^2 + x^2 - y^2 - z^2 & 2(xy - wz) & 2(xz + wy) \\ 2(xy + wz) & w^2 - x^2 + y^2 - z^2 & 2(yz - wx) \\ 2(xz - wy) & 2(yz + wx) & w^2 - x^2 - y^2 + z^2 \end{pmatrix}$$

The rotation matrices R are calculated in the number of n as a sampling number from the stationary state to at least hitting. A rotation matrix R'(n) for obtainment of the position changes from the initial position of the first line segment 81 in the stationary state to the nth position of hitting is calculated by integration of n rotation matrices as R'(n)=R(1)·R(2)· . . . R(n). The position of the first line segment 81 at hitting is obtained from the rotation matrix R'(n). The impact line image data generation unit 101 in FIG. 4 generates image data of the impact line from the position of the first line segment 81 at hitting obtained in the position calculation part 100.

Note that, in the location calculation unit 51, the location coordinates of the club head 14c in the virtual three-dimensional space are specified by the first line segment 81 in the stationary state. In this regard, a distance from the location of the first inertial sensor 12 to the end of the club head 14c may be used for the length information of the shaft 14a. The shaft plane image data generation unit (third calculation unit) 52 specifies a plane containing the first line segment 81 and a second line segment as the target line (ball hitting direction) to be described later is specified as the shaft plane.

Figure 7:
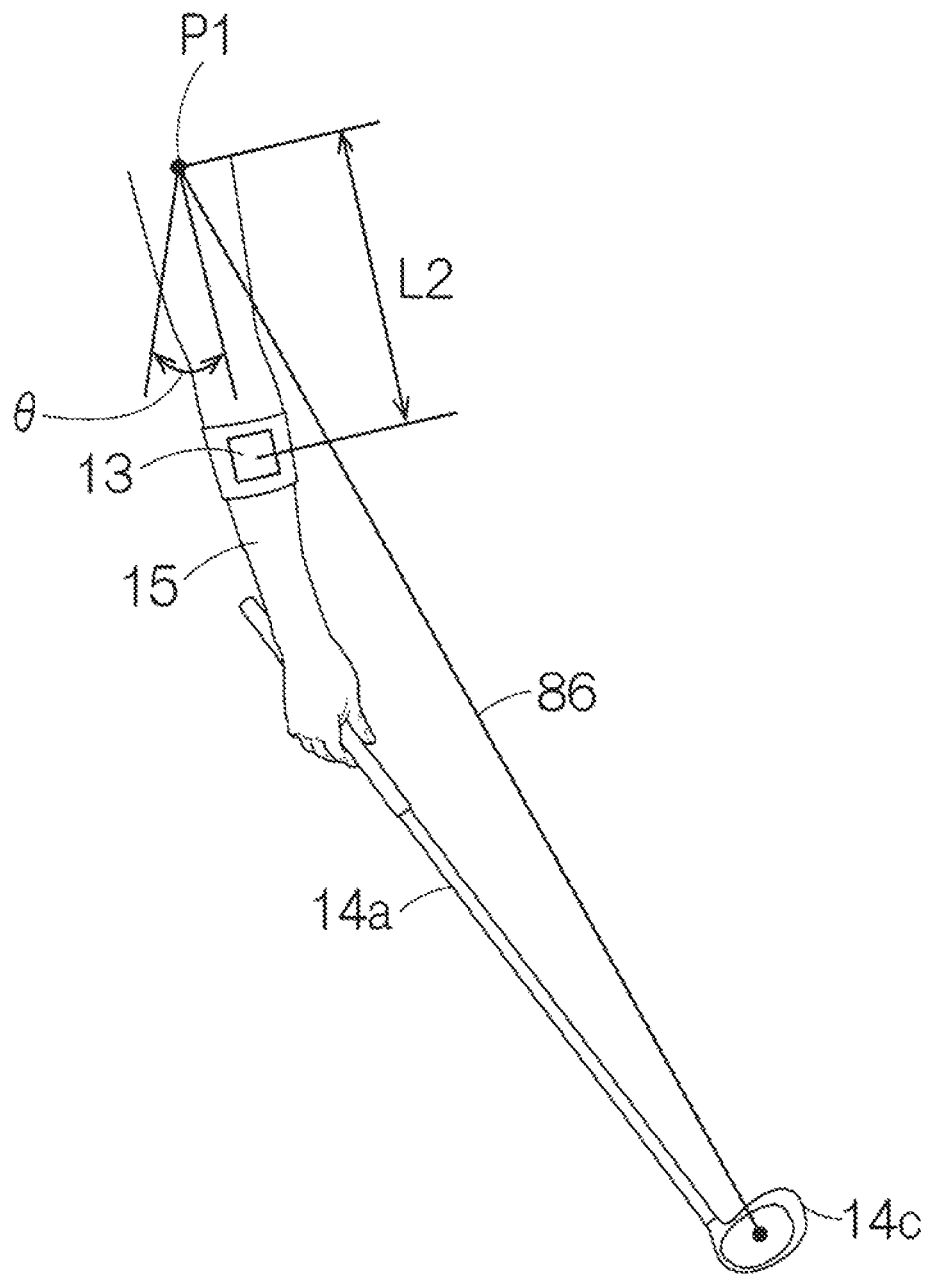
FIG. 7 is a conceptual diagram schematically showing a method of calculating a third line segment extending from a shoulder of a subject to an end of a sporting tool.

Next, a method of obtaining the Kogan plane (second virtual plane) is explained. First, the third line segment calculation part 51B (third calculation unit or fourth calculation unit) of the location calculation unit 51 calculates a third line segment 86 representing a direction from a shoulder P1 toward the distal end (club head) 14c of the shaft 14a shown in FIG. 7 according to the same calculation principle as that of the first line segment calculation part 51A. In this case, the acceleration sensor of the second inertial sensor 13 attached to the arm 15 of the subject shown in FIG. 7 is used. The third line segment calculation part 51B obtains the tilt θ of the arm 15 of the subject in the stationary state with respect to the direction of gravitational force G like the above described line segment 81 of the shaft plane, and calculates the location of the shoulder P1 using the previously input length information of the arm of the subject (the length from the second inertial sensor 13 to the shoulder P1) L2 and the tilt angle θ of the arm. The third line segment calculation part 51B calculates the third line segment 86 from the previously calculated location of the club head 14c and the location of the shoulder P1 obtained at this time. The hogan plane image data generation unit (fourth calculation unit or fifth calculation unit) 53 specifies a plane containing the third line segment 86 and the second line segment as the target line (hitting direction) to be described later as the hogan plane.

Figure 8:
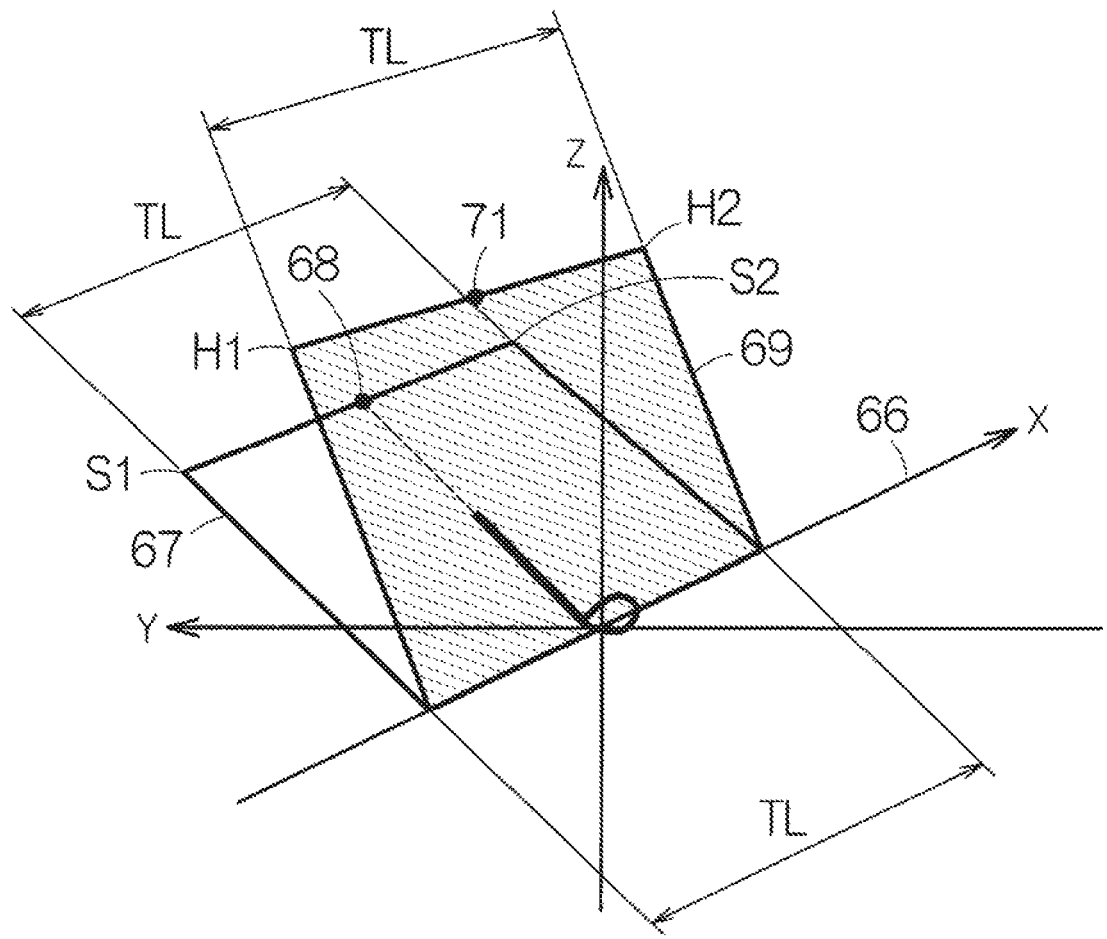
FIG. 8 is a conceptual diagram of a shaft plane and a hogan plane.
Figure 9:
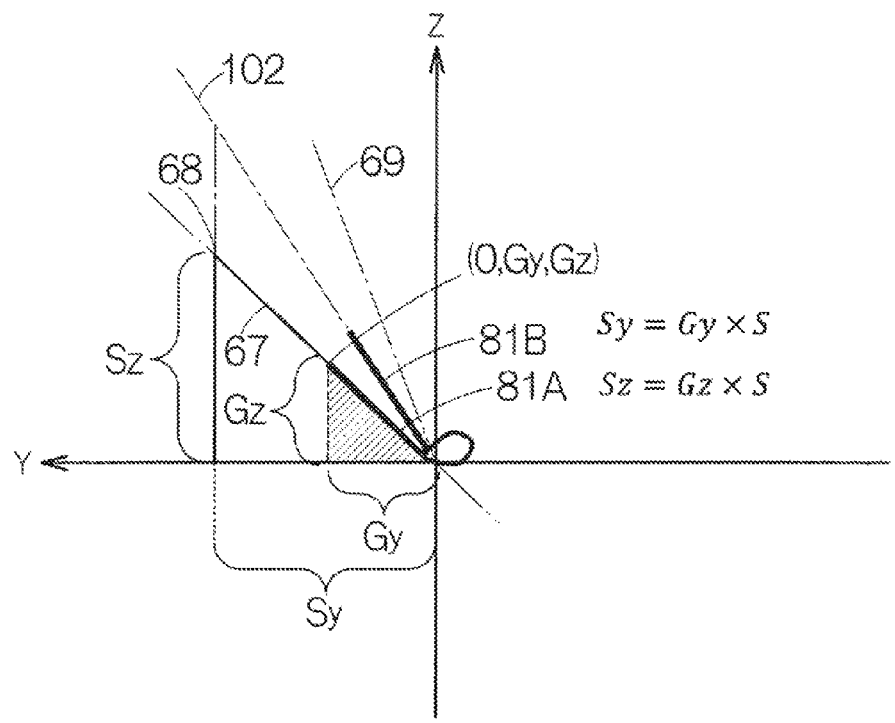
FIG. 9 is a conceptual diagram regarding a method of generating an impact line and a shaft plane.
Figure 10:
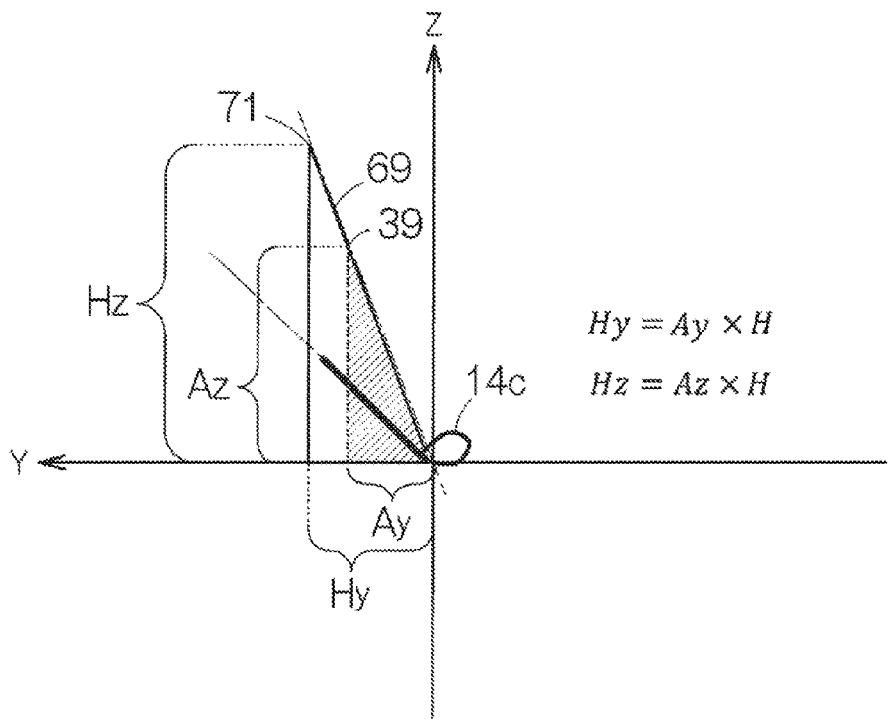
FIG. 10 is a conceptual diagram regarding a method of generating a hogan plane.

Next, with reference to FIGS. 8 to 10, the impact line image data generation unit 101, the shaft plane image data generation unit 52, and the hogan plane image data generation unit 53 are described in detail. The common coordinate calculation part 57 refers to the coordinates of the club head 14c in the stationary state and the scale data for the calculation of the vertex coordinates. As clearly known from FIG. 8, the scale data specifies a numerical value TL indicating the magnitude of a shaft plane 67 on a target line 66. The numerical value TL is set to a magnitude such that the entire swing motion may fall within the shaft plane 67 when the swing motion is projected on the shaft plane 67. For the calculation of the vertex coordinates, the common coordinate calculation part 57 checks the coordinates of the club head 14c against the target line 66, and thereby, the club head 14c may be positioned with respect to the target line 66.

The shaft plane reference coordinate calculation part 58 refers to first scale factor data for the calculation of the reference location. As shown in FIG. 9, the first scale factor data specifies a scale factor S of a first line segment 81A in the stationary state representing the shaft 14a. In response to the scale factor S, an extension of the first line segment 81A across the grip end (0,Gy,Gz) is specified. A reference location 68 (0,Sy,Sz) of the shaft plane 67 is specified on the end of the extension. The scale factor S of the first line segment 81A in the stationary state is set to a numerical value such that the entire swing motion may fall within the shaft plane 67 when the swing motion is projected on the shaft plane 67.

The shaft plane vertex coordinate calculation part 59 refers to the scale data for the calculation of the vertex coordinates. As clearly known from FIG. 8, a line segment having the length TL passing through the reference location 68 of the shaft plane 67 is specified. The coordinates S1, S2 of the vertexes are obtained on the ends of the line segment.

FIG. 9 shows a first line segment 81B at hitting obtained by the position calculation part 100. The first line segment 81B at hitting is enlarged according to the scale factor S of the first line segment 81A in the stationary state in the impact line image data generation unit 101, and image data of an impact line 102 is generated.

The hogan plane reference coordinate calculation part 62 refers to second scale factor data for the calculation of the reference location. As shown in FIG. 10, the second scale factor data specifies a scale factor H of a line segment connecting the shoulder and the club head 14c. In response to the scale factor H, an extension of the line segment across the shoulder is specified. The scale factor H of the line segment is set to a numerical value such that the entire swing motion may fall within a hogan plane 69 when the swing motion is projected on the hogan plane 69. In FIG. 10, for the specification of the scale factor H, the shoulder is projected on the yz-plane containing the longitudinal axis 43 of the shaft 14a. The reference location 71 (0,Hy,Hz) of the hogan plane 69 is specified based on the projected location. Therefore, the reference location 71 (0,Hy,Hz) is specified within the yz-plane.

The hogan plane vertex coordinate calculation part 63 refers to the scale data for the calculation of the vertex coordinates. As clearly known from FIG. 8, a line segment having the length TL passing through the reference location 71 of the hogan plane 69 is specified. The coordinates H1, H2 of the vertexes are obtained on the ends of the line segment.

(4) Operation of Golf Swing Analyzing Apparatus

The operation of the golf swing analyzing apparatus 11 is briefly explained. First, a golf swing of a golfer is measured. Prior to the measurement, necessary information is input from the input device 23 to the arithmetic processing circuit 16. The input information is managed under a specific identifier, for example. The identifier may identify a specific golfer.

Prior to the measurement, the first and second inertial sensors 12, 13 are attached to the golf club 14 and the upper limb 15 of the golfer. As the upper limb 15, the left arm may be chosen for a right-handed golfer. This is because bending of the left arm from the start of the golf swing to impact is less. The first and second inertial sensors 12, 13 are relatively immovably fixed to the upper limb 15 and the golf club 14.

Prior to execution of the golf swing, the measurement of the first and second inertial sensors 12, 13 is started. At the start of the measurement, the first and second inertial sensors 12, 13 are set in predetermined locations and positions. During the measurement, synchronization is secured between the first and second inertial sensors 12, 13. The first and second inertial sensors 12, 13 continuously measure the accelerations and the angular velocities at specific sampling intervals. The sampling intervals define the resolution of the measurement. The detection signals of the first and second inertial sensors 12, 13 may be sent into the arithmetic processing circuit 16 in real time, or temporarily stored in memory devices built in the first and second inertial sensors 12, 13. In the latter case, the detection signals may be sent to the arithmetic processing circuit 16 via wired or wireless connection after the end of the golf swing.

For the measurement of the golf swing, the subject first assumes a stationary position of address. At the address, the subject reproduces a position at the moment of impact. As a result, a virtual position at the moment of impact is extracted from a series of motion of "golf swing". At the same time, the golf club 14 is held in the stationary position. The position of the upper limb 15 of the subject is fixed. The detection signals at address are output from the first and second inertial sensors 12, 13. Here, when the stationary positions of the golf club 14 and the upper limb 15 are maintained over a predetermined time interval, the subject may be informed of completion of the measurement at address. For the notification, e.g., an auditory signal may be used. Subsequently, the subject performs swing motion. The golf swing starts from take-back, back-swing, down-swing, through impact, follow, to finish. During the swing motion, the detection signals are output from the first and second inertial sensors 12, 13.

The arithmetic processing circuit 16 executes an analysis of the golf swing in response to reception of the detection signals. The analysis may be performed between the start of take-back to the end of follow, or from the start of take-back to impact. The location calculation unit 51 of the arithmetic processing circuit 16 calculates the first line segment 81 representing the direction in which the shaft 14a of the golf club 14 extends at address based on the detection signals from the acceleration sensor at address. The shaft plane image data generation unit 52 calculates the shaft plane 67 from the first line segment 81 and the second line segment (target line) 66. The hogan plane image data generation unit 53 of the arithmetic processing circuit 16 calculates the hogan plane based on the detection signals from the acceleration sensor within the second inertial sensor 13 at address. The swing motion calculation unit 54 of the arithmetic processing circuit 16 calculates the swing motion. Particularly, the position calculation part 100 calculates the position changes from address to impact of the first line segment 81 using the output from the angular velocity sensor of the first inertial sensor 12 with the position data of the first line segment 81 at address from the first line segment calculation part 51A as the initial position. Thereby, the position of the first line segment 81 at impact (impact line 102) is calculated. The swing motion calculation unit 54 may calculate the movement trace of at least one point on the golf club 14 based on the detection signals in the swing motion using the data of the position changes of the first line segment 81.

Figure 11:
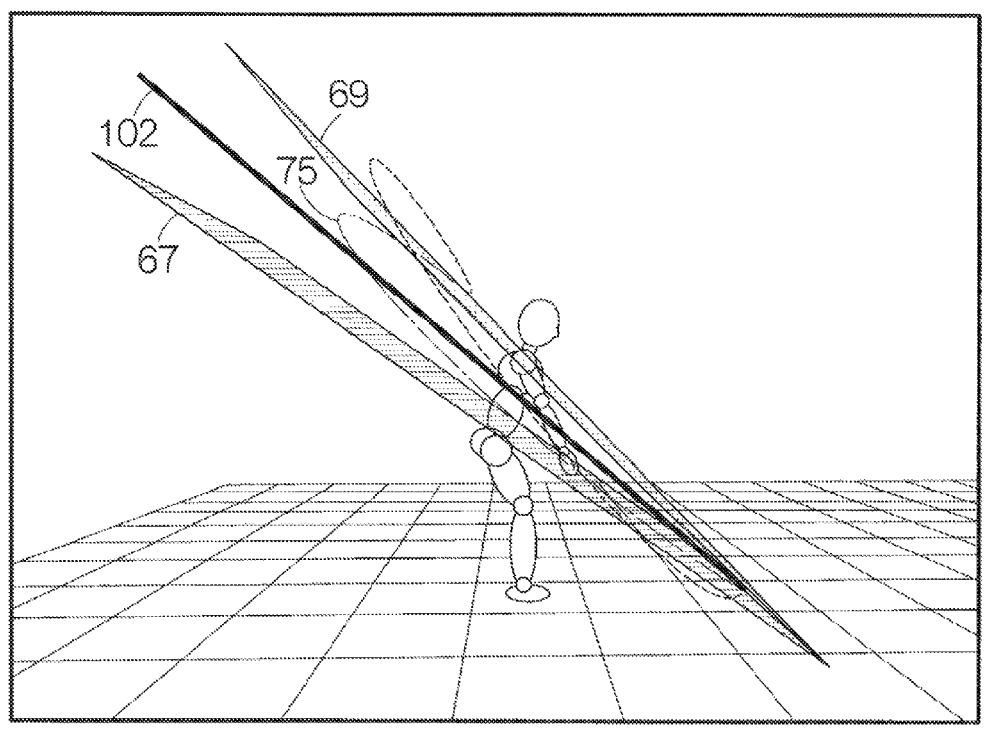
FIG. 11 is a conceptual diagram schematically showing one specific example of an image relating to an analysis result.

Thereby, as shown in FIG. 11, the calculation of the impact line 102, the shaft plane 67, the hogan plane 69 and the trace 75 of the golf club 14 may be superimposed and three-dimensionally visualized, for example. Accordingly, the subject may use whether or not the impact line 102 is above the shaft plane 67 at address, whether or not the impact line 102 is below the hogan plane 69, whether or not the impact line 102 falls within a range between the shaft plane 67 and the hogan plane 69 (V-zone), whether or not on-plane swing that the trace 75 of the down-swing, particularly, is in parallel to the impact line 102 is reproduced, or the like as an index for the quality of the ball hitting. Note that it is necessary that at least one of the shaft plane 67, the hogan plane 69, and the trace 75 as comparative information for comparison to the impact line 102.

The target line 66 is calculated based on the detection signals at address. For the calculation, it is preferable that one of the plurality of detection axes of the first inertial sensor 12 is aligned with the ball hitting direction (x-axis in FIG. 8) specified by the orientation of the face in advance. Therefore, when the coordinates of the club head 14c are specified at address, the target line 66 is specified based on the translation of the first inertial sensor 12 in the x-axis direction. Note that the specification of the target line 66 may be realized using another method. Further, by other means, the target line 66 may be specified by a cross product of the acceleration vector in the longitudinal axis direction and the acceleration vector in the direction of gravitational acceleration of the golf club.

(5) Configuration of Golf Swing Analysis According to Second Embodiment

Figure 12:
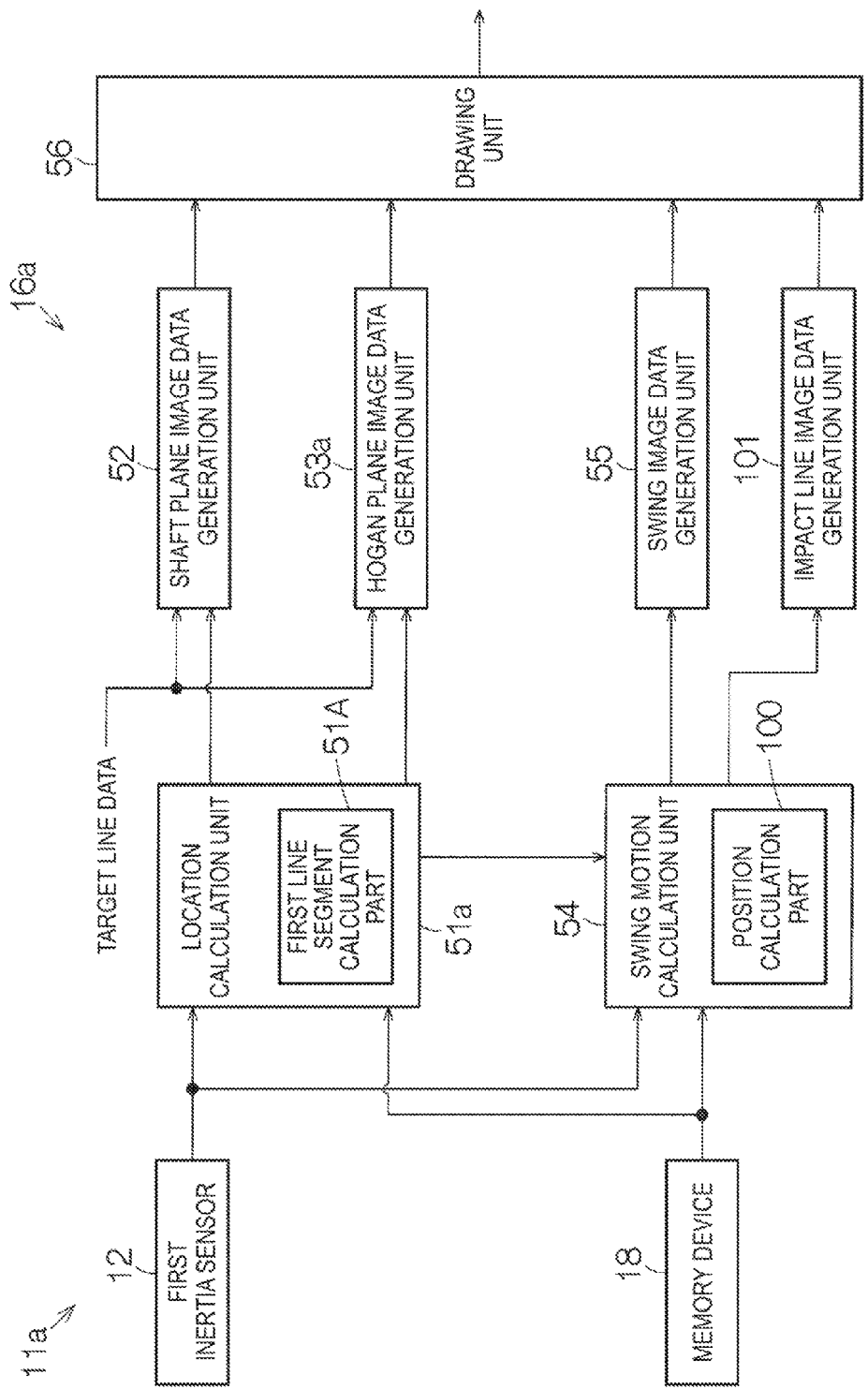
FIG. 12 is a block diagram schematically showing a configuration of an arithmetic processing circuit of a golf swing analyzing apparatus according to the second embodiment.

FIG. 12 schematically shows a configuration of a golf swing analyzing apparatus 11a according to the second embodiment. In the golf swing analyzing apparatus 11a, the second inertial sensor 13 is omitted compared to the golf swing analyzing apparatus 11 according to the first embodiment. That is, for the analysis of golf swing, a single inertial sensor, i.e., the first inertial sensor 12 is used. An arithmetic processing circuit 16a is replacing the arithmetic processing circuit 16 according to the first embodiment. A location calculation unit 51a replacing the location calculation unit 51 has the first line segment calculation part 51A, but does not have the third line segment calculation part 51B. The hogan plane image data generation unit 53 is replaced by a hogan plane image data generation unit 53a.

Figure 13:
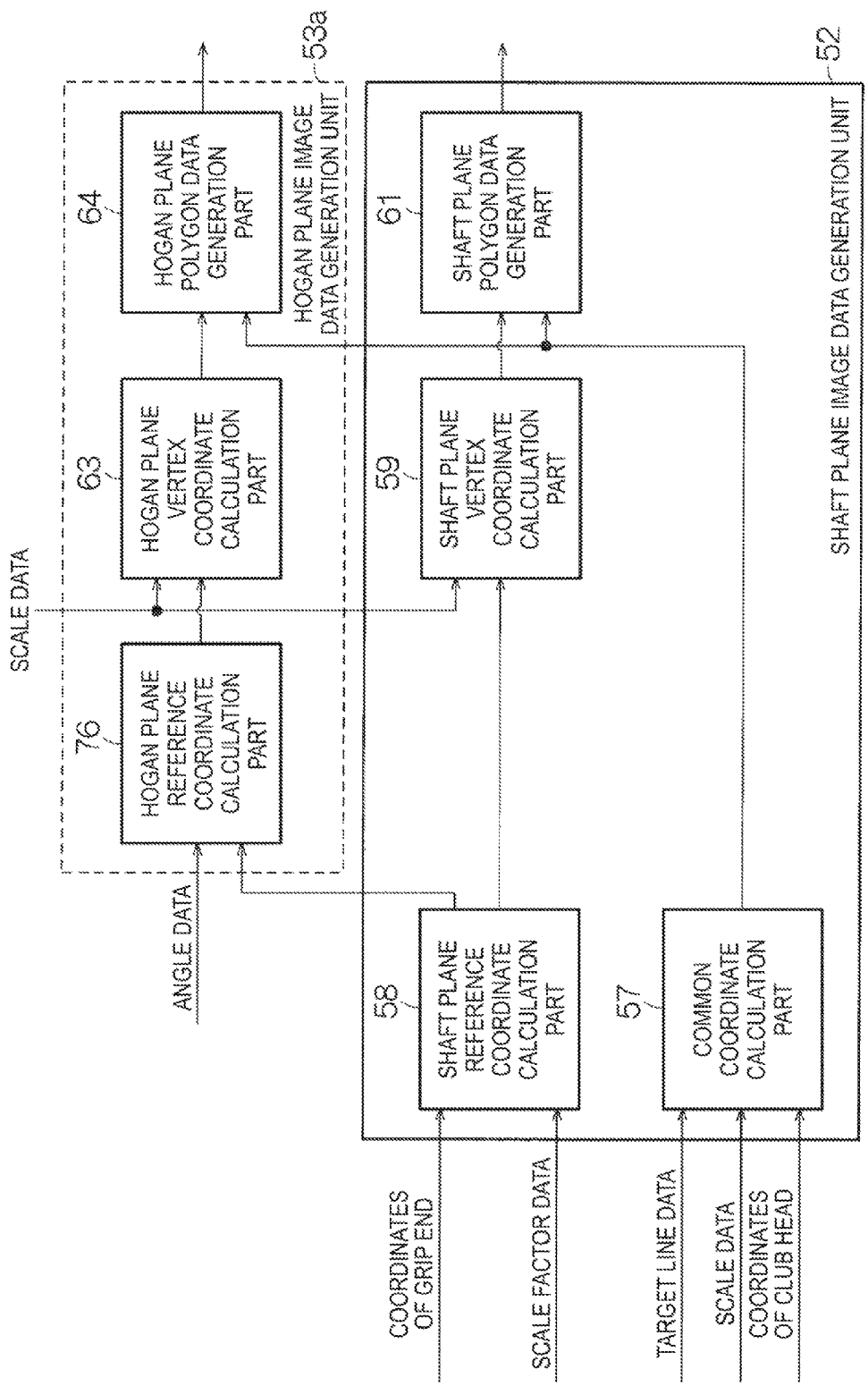
FIG. 13 is a block diagram schematically showing a configuration of a shaft plane image data generation unit and a hogan plane image data generation unit.

As shown in FIG. 13, the shaft plane image data generation unit 52 has the same configuration as that described above. On the other hand, a hogan plane reference coordinate calculation part 76 of the hogan plane image data generation unit 53a is connected to the shaft plane reference coordinate calculation part 58. The hogan plane reference coordinate calculation part 76 calculates the reference location of the hogan plane based on the reference location of the shaft plane 67. For the calculation, the hogan plane reference coordinate calculation part 76 refers to angle data. The angle data may be stored in the memory device 18 in advance. The hogan plane vertex coordinate calculation part 63 calculates two vertexes of the hogan plane 69 in the same manner as that described above based on the calculated reference location.

Figure 14:
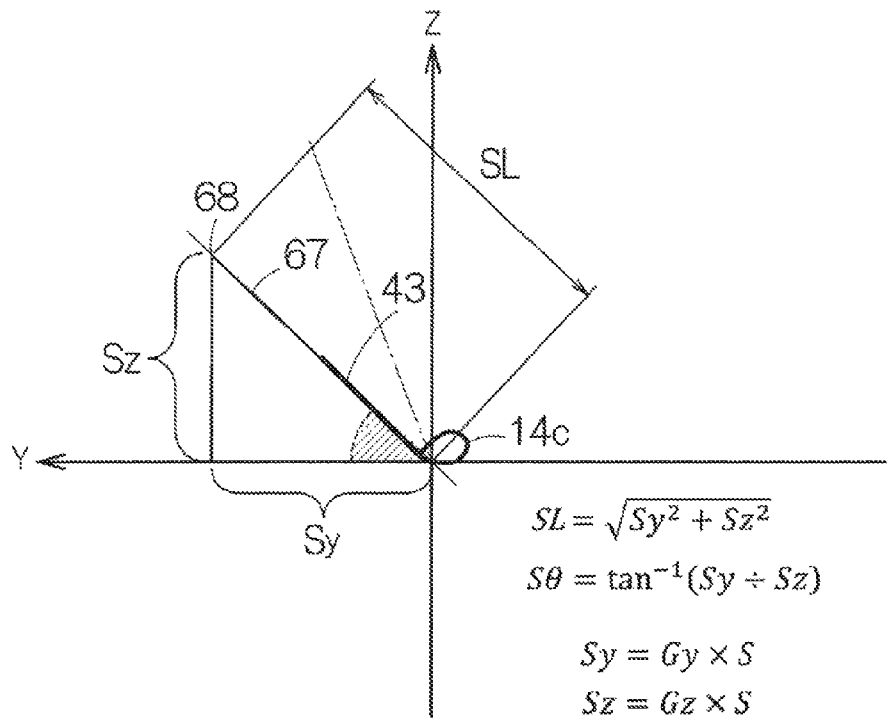
FIG. 14 is a conceptual diagram regarding a method of generating a shaft plane.

As shown in FIG. 14, for the calculation of the reference location (0,Hy,Hz) of the hogan plane, a length SL and an angle Sθ of the shaft plane 67 are sent to the hogan plane reference coordinate calculation part 76. The length SL and the angle Sθ are calculated based on the coordinates (0,Sy,Sz) of the reference location 68 of the shaft plane 67. These may be calculated by the shaft plane reference coordinate calculation part 58 or calculated by the hogan plane reference coordinate calculation part 76.

Figure 15:
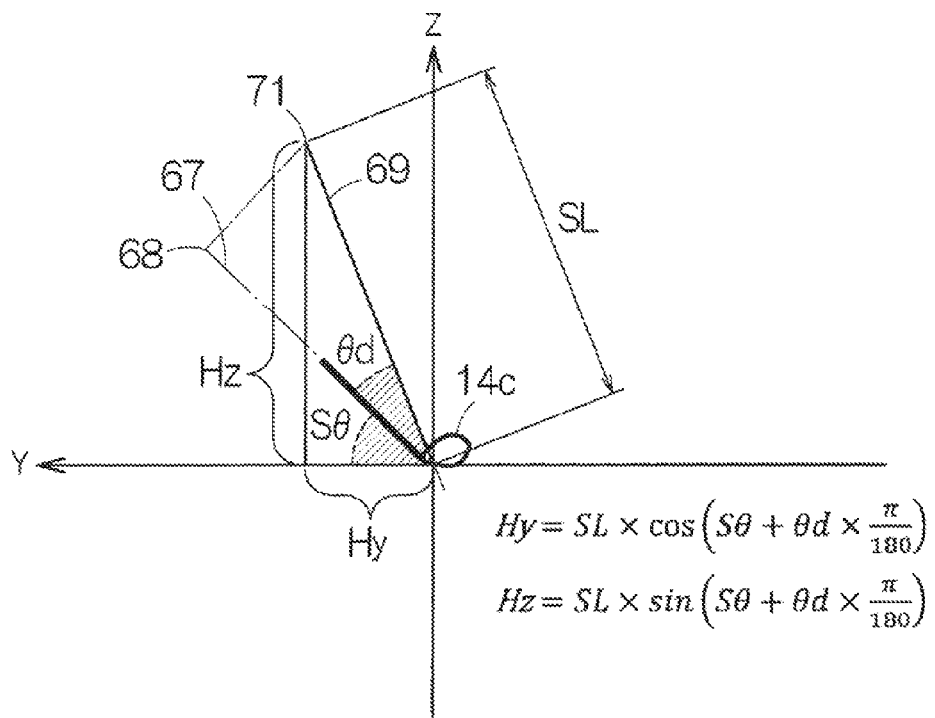
FIG. 15 is a conceptual diagram regarding a method of generating a hogan plane.

As shown in FIG. 15, the hogan plane reference coordinate calculation part 76 rotates the reference location 68 of the shaft plane 67 around the target line 66. An angle θd of the rotation is specified by the angle data. In response to the rotation, the reference location (0,Hy,Hz) of the Kogan plane 69 is obtained. According to the golf swing analyzing apparatus 11a, the golf swing analysis is realized by the single inertial sensor (first inertial sensor 12).

Note that, in the embodiments, the individual functional blocks of the arithmetic processing circuits 16, 16a are realized in response to the execution of the golf swing analysis software program 19. Note that the individual functional blocks may be realized by hardware without reliance on software processing. In addition, the golf swing analyzing apparatuses 11, 11a may be applied to swing analyses of sporting tools (e.g., tennis rackets and table-tennis rackets) held and swung by hands. In this case, a virtual plane corresponding to the shaft plane may be used for swing analyses.

As above, the embodiments have been explained in detail, however, a person skilled in the art could readily understand that many modifications may be made without substantially departing from the new matter and the advantages of the invention. Therefore, these modified examples may fall within the range of the invention. For example, in the specification and the drawings, terms described with different terms in a broader sense or synonymous sense at least once may be replaced by the different terms in any part of the specification or drawings. Further, the configurations and operations of the first and second inertial sensors 12, 13, the golf club 14, the grip 14b, the club head 14c, the arithmetic processing circuit 16, etc. are not limited to those explained in the embodiments, and various modifications maybe made. For example, the sporting tool having the ball hitting surface and the shaft part such as a golf club has been explained as an example in the invention, however, the shaft part is not necessarily linear, and the invention may be applied to a sporting tool curved or bent in the longitudinal axis direction. Further, the golf swing has been explained as an example in the invention, however, the concept of the invention may be applied to tennis, baseball, or the like as sports of hitting balls with sporting tools, and the metrics for the quality of the swing may be provided to the subject.

The entire disclosure of Japanese Patent Application No. 2013-226035, filed Oct. 30, 2013 is expressly incorporated by reference herein.

What is claimed is:

1. A motion analyzing apparatus comprising:
   a first calculation unit that calculates a position of a first line segment representing a direction in which a rod-like part of a sporting tool extends in a stationary state;
   a second calculation unit that calculates the position of the first line segment at hitting;
   a third calculation unit that specifies a virtual plane formed by the first line segment in the stationary state and a second line segment representing a ball hitting direction; and
   a display that displays a relation between the virtual plane and the first line segment at the hitting,
   wherein the relation between the virtual plane and the first line segment at the hitting is compared.

2. The motion analyzing apparatus according to claim 1, wherein the position of the first line segment is calculated from output of an inertial sensor attached to the sporting tool.

3. The motion analyzing apparatus according to claim 2, wherein the output of the inertial sensor contains information of acceleration, and
   the first calculation unit calculates a tilt of the rod-like part with respect to a direction of gravitational force using the information of acceleration in the stationary state.

4. The motion analyzing apparatus according to claim 2, wherein the second calculation unit calculates position changes of the first line segment from the stationary state to the hitting using the output of the inertial sensor to calculate the position of the first line segment at the hitting.

5. A motion analyzing apparatus comprising:
   a first calculation unit that calculates a position of a first line segment representing a direction in which a rod-like part of a sporting tool extends in a stationary state;
   a second calculation unit that calculates the position of the first line segment at hitting;
   a third calculation unit that specifies a first virtual plane formed by the first line segment in the stationary state and a second line segment representing a ball hitting direction;
   a fourth calculation unit that specifies a third line segment representing a direction from a part of a shoulder or a neck of a subject to a hitting part in the stationary state;
   a fifth calculation unit that specifies a second virtual plane formed by the second line segment and the third line segment; and
   a display that displays whether or not the first line segment at the hitting falls within a range between the first virtual plane and the second virtual plane,
   wherein whether or not the first line segment at the hitting falls within a range between the first virtual plane and the second virtual plane is determined.

6. The motion analyzing apparatus according to claim 5, wherein the position of the first line segment is calculated from output of an inertial sensor attached to the sporting tool.

7. The motion analyzing apparatus according to claim 6, wherein the output of the inertial sensor contains information of acceleration, and
   the first calculation unit calculates a tilt of the rod-like part with respect to a direction of gravitational force using the information of acceleration in the stationary state.

8. The motion analyzing apparatus according to claim 6, wherein the second calculation unit calculates position changes of the first line segment from the stationary state to the hitting using the output of the inertial sensor to calculate the position of the first line segment at the hitting.

9. The motion analyzing apparatus according to claim 5, wherein the fourth calculation unit uses a line segment formed by rotation of the first line segment in the stationary state around a rotation axis of the second line segment as the third line segment.

10. The motion analyzing apparatus according to claim 5, wherein the fifth calculation unit uses a virtual plane formed by rotation of the first virtual plane around a rotation axis of the second line segment as the second virtual plane.

11. The motion analyzing apparatus according to claim 1, wherein the second line segment is in a direction orthogonal to a ball hitting surface of the sporting tool in the stationary state.

12. The motion analyzing apparatus according to claim 5, wherein the second line segment is in a direction orthogonal to a ball hitting surface of the sporting tool in the stationary state.

* * * * *